US00RE33841E

United States Patent [19]

Rush et al.

[11] E

Patent Number: Re. 33,841

[45] Reissued Date of Patent: Mar. 10, 1992

[54] DUAL SPRAY CONE ELECTROMAGNETIC FUEL INJECTOR

[75] Inventors: James H. Rush, Pittsford; Donald J. Dobesh, Sr., West Henrietta, both of N.Y.

[73] Assignee: General Motors Corporation, Detroit, Mich.

[21] Appl. No.: 652,393

[22] Filed: Feb. 6, 1991

Related U.S. Patent Documents

Reissue of:

[64] Patent No.: 4,699,323
Issued: Oct. 13, 1987
Appl. No.: 855,485
Filed: Apr. 24, 1986

U.S. Applications:

[63] Continuation of Ser. No. 416,569, Oct. 3, 1989, abandoned.

[51] Int. Cl.[5] ..... E02M 67/06

[52] U.S. Cl. ..... 239/543; 239/557; 239/552; 239/585.4

[58] Field of Search ..... 239/543, 544, 551, 552, 239/558, 561, 533.12, 533.13, 585, 546, 554; 123/47, 445

[56] References Cited

U.S. PATENT DOCUMENTS

| | | | |
|---|---|---|---|
| 1,494,020 | 5/1924 | Riehm | 239/543 X |
| 2,382,151 | 8/1945 | Harper | 239/558 |
| 2,995,123 | 8/1961 | Goschel | 123/470 |
| 4,057,190 | 11/1977 | Kiwion et al. | 239/558 |
| 4,218,021 | 8/1980 | Palma | 239/585 |
| 4,519,370 | 5/1985 | Iwata | 239/533.12 X |
| 4,549,511 | 10/1985 | Grieshaber et al. | 123/263 |
| 4,646,974 | 3/1987 | Sofianek et al. | 239/585 |

FOREIGN PATENT DOCUMENTS

| | | | |
|---|---|---|---|
| 514104 | 9/1952 | Belgium . | |
| 201190 | 12/1986 | European Pat. Off. . | |
| 1035456 | 4/1953 | France | 239/544 |
| 806114 | 9/1959 | France . | |
| 78187 | 4/1930 | Sweden . | |
| 827889 | 5/1981 | U.S.S.R. | 239/544 |
| 1032 | of 1878 | United Kingdom | 239/544 |
| 2059503 | 4/1981 | United Kingdom . | |
| 2148388 | 10/1983 | United Kingdom . | |

OTHER PUBLICATIONS

U.S. patent application Ser. No. 730,462 filed May 6, 1985 in the names of Jay K. Sofianek; John F. Nally; James H. Rush; Robert L. Fuss; John E. Williams; Allan M. Ruckey.

*Primary Examiner*—Andres Kashnikow
*Assistant Examiner*—Kevin Weldon
*Attorney, Agent, or Firm*—Charles K. Veenstra

[57] ABSTRACT

An electromagnetic fuel injector is provided intermediate its solenoid actuated valve and a spray tip having an enlarged axial discharge passage extending therethrough with an orifice director plate having two sets of orifice passages extending therethrough with orifice passages of each set orientated relative to each other so as to produce a cone spray whereby this orifice director plate is operative to produce a dual diverging cone spray patterns for discharge out through the axial discharge passage.

7 Claims, 1 Drawing Sheet

DUAL SPRAY CONE ELECTROMAGNETIC FUEL INJECTOR

Matter enclosed in heavy brackets [ ] appears in the original patent but forms no part of this reissue specification; matter printed in italics indicates the additions made by reissue.

*This is a continuation of application Ser. No. 07/416569 filed on Oct. 3, 1989 now abandoned.*

FIELD OF THE INVENTION

This invention relates to electromagnetic fuel injectors and, in particular, to such an injector having an orifice director plate therein that is located downstream of the solenoid actuated valve of the assembly, with the orifice director plate having two sets of plural orifice passages arranged to produce dual spray cones.

DESCRIPTION OF THE PRIOR ART

Electromagnetic field injectors are used in fuel injection systems for vehicle engines because of the capability of this type injector to more effectively control the discharge of a precise metered quantity of fuel per unit of time to an engine. Such electromagnetic fuel injectors, as used in vehicle engines, are normally calibrated so as to inject a predetermined quantity of fuel per unit of time prior to their installation in the fuel system for a particular engine.

In one form of electromagnetic fuel injector as disclosed, for example, in U.S. Pat. No. 4,218,021 entitled "Electromagnetic Fuel Injector" issued Aug. 19, 1980 to James D. Palma, the injector includes an orifice director plate, located downstream of the solenoid actuated valve, which is provided with plural orifice passages extending therethrough, end of these being inclined downward at an angle relative to the reciprocating axis of the valve and orientated such that fuel discharged from each orifice passage impinges tangentially onto the peripheral surface defining an axial extending discharge passage or swirl chamber at the spray tip end of the injector to produce a hollow conical fuel spray pattern having a relatively large cone angle of approximately 50° or larger.

In an other form of electromagnetic fuel injector, as disclosed in pending U.S. patent application Ser. No. 730,462, filed May 6, 1985 now U.S. Pat. No. 4,646,974 in the name of Sofianek et al. and assigned to a common assignee as the subject application, there is disclosed an orifice director plate having a plurality of circumferentially spaced apart through orifice passages, the axis of each orifice passage being inclined downward at an angle to the reciprocating axis of the valve and extending radially inward toward this axis and are angularly located so that the streams of fuel discharged from these orifice passages partly intersect each other so as to form a hollow, narrow conical fuel spray pattern.

With the current interest in use of two intake valves in a three or four valve per cylinder type gasoline engine, it has now been found desirable to modify electromagnetic fuel injectors in a suitable manner so that a single electromagnetic fuel injector can be used to supply fuel to the two separate induction passages extending to the two intake valves.

As one solution to this problem, it has been proposed to use a director element means, located downstream of a solenoid actuated valve, which is provided with two downwardly inclined orifice passages which are effective to produce two diverging, pencil like, discharged streams of fuel from the injector which can be targeted to flow through the respective induction passages toward the separate intake valves.

However since it can be shown by statistical theory and by experimental results that multiple flow orifices in parallel flow relationship are superior in unit-to-unit flow repeatability to a single flow orifice of comparable flow area it would thus appear that two sets of multiple flow orifices in parallel flow relationship would also be superior in unit-to-unit flow repeatability to such a pair of flow orifice of compatible flow areas.

SUMMARY OF THE INVENTION

Accordingly, a primary object of the present invention is to provide an improved electromagnetic fuel injector having an orifice director plate incorporated therein downstream of the solenoid controlled valve of the injector and positioned at right angles to the reciprocating axis of the valve, the orifice director plate having two sets of multiple orifice passages arranged on opposite sides of a vertical plane extending as through the reciprocating axis of the valve, with the orifice passages in each set being arranged so that the stream of fuel discharged therefrom partially impinge on each other whereby these two sets of orifice passages are operative to produce two diverging atomized cone fuel spray patterns so as, for example, to supply fuel to the two intake valves as in a three or four valve per cylinder type engine.

Still another object of this invention is to provide an injector apparatus of the above type which includes features of construction, operation and arrangement, rendering it easy to manufacture, assemble and to calibrate for desired fuel flow, which is reliable in operation, and in other respects suitable for use on production motor vehicle fuel systems.

The present invention provides an electromagnetic fuel injector having a housing with a solenoid stator means incorporated at one end thereof and an injection nozzle assembly incorporated at the opposite or discharge end thereof. An armature/valve member is reciprocable along a reciprocating axis relative to a pole piece of the stator means and an associate valve seat of the nozzle assembly to control fuel flow to the remaining elements of the injection nozzle assembly. The injection nozzle assembly further includes an orifice director plate that is positioned at right angles to the reciprocating axis. Two sets of plural orifice passages are provided in the orifice director plate and located concentrically about the reciprocating axis with one set of such orifice passage being located on one side of a vertical plane extending through this axis while the other set of such orifice passages is located on the other side of this vertical plane.

Each set of such orifice passages includes a first orifice passage that extend through the orifice director plate normal to the opposed surface of this plate and thus parallel to the reciprocating axis and is located on a vertical plane extending through this axis at right angles to the above described plane. Each set further includes second and third orifice passages each having its respective axis inclined relative to the reciprocating axis and inclined toward and relative to the axis of the first orifice passage, such that streams of fuel discharged through these orifice passages will partially intersect the stream discharged from the first orifice passage on opposite sides thereof, whereby these sets of orifice passages will produce two separate, diverging cone fuel spray patterns for discharge from the injector.

For a better understanding of the invention, as well as other objects and features thereof, reference is had to the following detailed description of the invention to be read with the accompanying drawings.

DESCRIPTION OF THE EMBODIMENT

Figure 1:
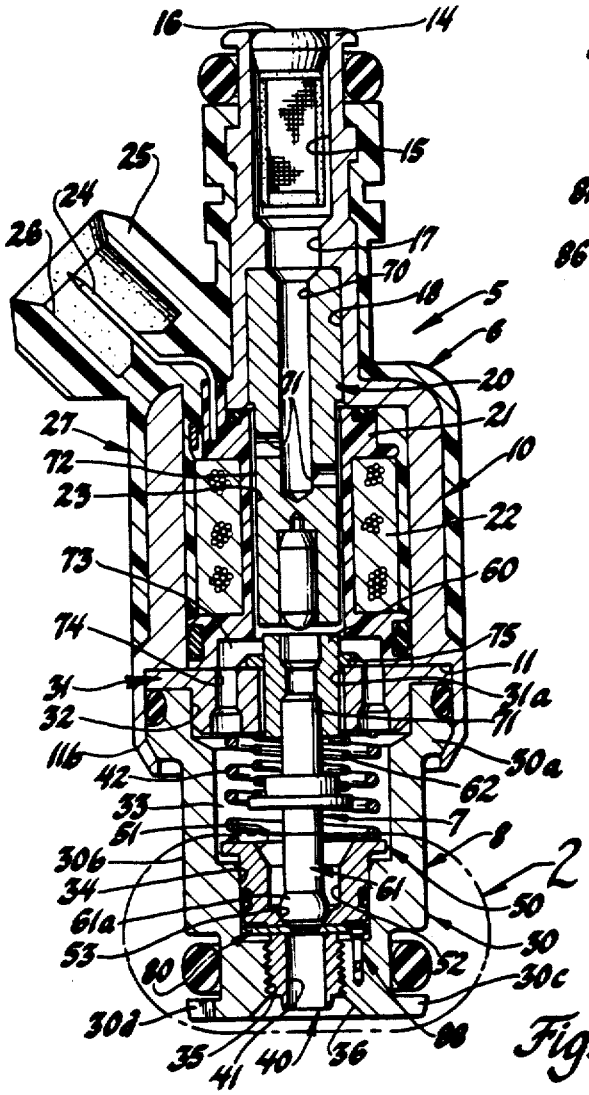
FIG. 1 is a longitudinal, cross-sectional view of an electromagnetic fuel injector with an orifice director plate in accordance with the invention incorporated therein, the stop pin and valve member of the injector being shown in elevation.

Referring first to FIG. 1 there is illustrated an electromagnetic fuel injector, generally designated 5, with an orifice director plate in accordance with a preferred embodiment of the invention incorporated therein. The electromagnetic fuel injector 5 is of a type similar to that disclosed in U.S. Pat. No. 4,423,842 entitled "Electromagnetic Fuel Injector with Self Aligned Armature" issued Jan. 3, 1984 to James D. Palma, or as disclosed in the above-mentioned U.S. patent application Ser. No. 730,462 having a top fuel inlet, and the subject injector includes, as major components thereof, an upper solenoid stator assembly 6, a lower nozzle assembly 8 with an armature/valve 7 operatively positioned therein.

The solenoid stator assembly 6 includes a solenoid body 10 having an upper tubular inlet tube portion 14. The inlet tube portion 14 of the solenoid body 10 at its upper end, with reference to FIG. 1, is adapted to be suitably connected, as by a fuel rail, to a source of low pressure fuel and is provided with a stepped bore that extends axially therethrough so as to define, starting from its upper end, an inlet fuel chamber 15 having a fuel filter 16 mounted therein, an axial inlet passage 17, and a pole piece receiving bore wall 18 of a predetermined internal diameter to receive, as by a press fit, the upper enlarged diameter end portion of a stepped diameter pole piece 20.

The solenoid stator assembly 6 further includes a spool-like, tubular bobbin 21 supporting a wound wire solenoid coil 22. The bobbin 21 is provided with a central through bore 23 of a diameter so as to loosely encircle the lower reduced diameter end of the pole piece 20.

A pair of terminal leads 24, only one being shown in FIG. 1, are each operatively connected at one end to the solenoid coil 22 and each such lead has its other end extending up through a stud 25, defining a terminal socket 26, formed as part of an encapsulant member 27, made of a suitable encapsulant material, for connection to a suitable controlled source of electrical power, as desired, in a manner well known in the art.

The nozzle assembly 8 includes a nozzle body 30 of tubular configuration having a stepped upper flange 30a with an extremely stepped lower body 30b of reduced external diameter depending therefrom that terminates at a radial outward extending flange 30c.

The nozzle body 30 is fixed to the solenoid housing 10, with a separate stepped spacer disk 31 sandwiched between the upper surface of the nozzle body 30 and the shoulder 11 of the solenoid body, as by inwardly crimping or swaging the lower end of the body position portion to define a radially inwardly extending rim flange 11b.

Nozzle body 30 is provided with a central stepped bore to provide a circular, internal upper wall 32 of a diameter to slidably receive the depending hub portion of the spacer disk 31, an intermediate upper wall defining a spring/fuel supply cavity 33, an intermediate lower wall defining a valve seat receiving cavity 34, a lower internally threaded wall 35 terminating in a radially outward flared discharge wall 36.

The nozzle assembly 8 further includes a tubular spray tip 40, having an axial discharge passage 41 therethrough, that is adjustable threaded into the internally threaded wall 35 of the nozzle body 30, suitable opposed flats 40a being provided on the outlet end of the spray tip to effect rotation thereof, as by a suitable wrench. At its upper end, the spray tip 40 axially supports an orifice director plate, designated 80, in accordance with a preferred embodiment of the invention to be described in detail hereinafter, which is loosely received in the cavity 34.

The orifice director plate 80 is held in abutment against the upper end of the spray tip 40 by means of a valve seat element 50, also loosely received in the cavity 34 and which is normally biased in an axial direction toward the spray tip 40, downward with reference to FIG. 1, by a coiled spring 42, one end of which abuts against the valve seat element 50 while its opposite end abuts against the spacer disk 31.

The valve seat element 50 is also provided with a stepped axial bored passage defined by an upper radially inward inclined wall 51, a straight intermediate wall 52 terminating in a radially inward inclined wall defining an annular frusto-conical valve seat 53.

Referring now to the armature valve member 7, it includes a tubular armature 60 and a valve element 61, the latter being made, for example of stainless steel, the lower end thereof having a valve 61a head which is of semi-spherical configurations and of a predetermined radius with its lower truncated end portion defining a valve seating surface 61b for seating engagement with the valve seat 53. The armature 60 is suitably fixed to the upper shank portion of the valve element 61, as by being crimped thereon, and is formed with a predetermined outside diameter so as to be loosely slidable through the central bored aperture 31a provided in the spacer disk 31.

The valve 61a head of valve element 61 is normally biased into seating engagement with the valve seat 53 by a valve return spring 62 of predetermined force which loosely encircles the upper shank of the valve element 61.

The pole piece 20, as shown in FIG. 1, is also provided with a blind bore defining an inlet passage portion 70 which at one end is in flow communication with the inlet passage 17 and which adjacent to its other or lower end is in flow communication via radial ports 71 with an annulus fuel cavity 72 formed by the diametrical clearance between the reduced diameter lower end of the pole piece 20 and the bore wall 23 of bobbin 21. Fuel cavity 72 is, in turn, in flow communication with the annular recessed cavity 73 provided at the lower end bobbin 21 and via through passages 74 in the spacer disk 31 located radially outward of a guide washer 75 with the spring/fuel cavity 33.

Figure 3:
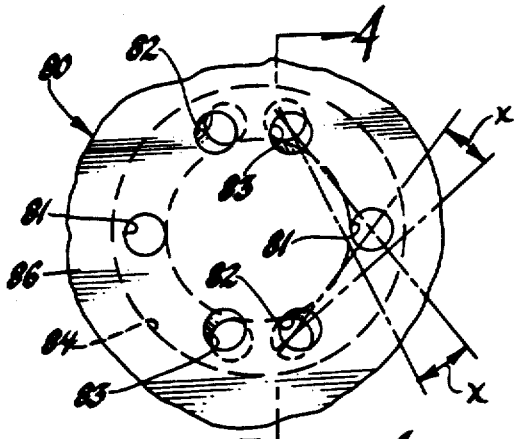
FIG. 3 is an enlarged bottom view of the central orifice passage portion of the orifice director plate per se, taken along line 3—3 of FIG. 2.
Figure 2:
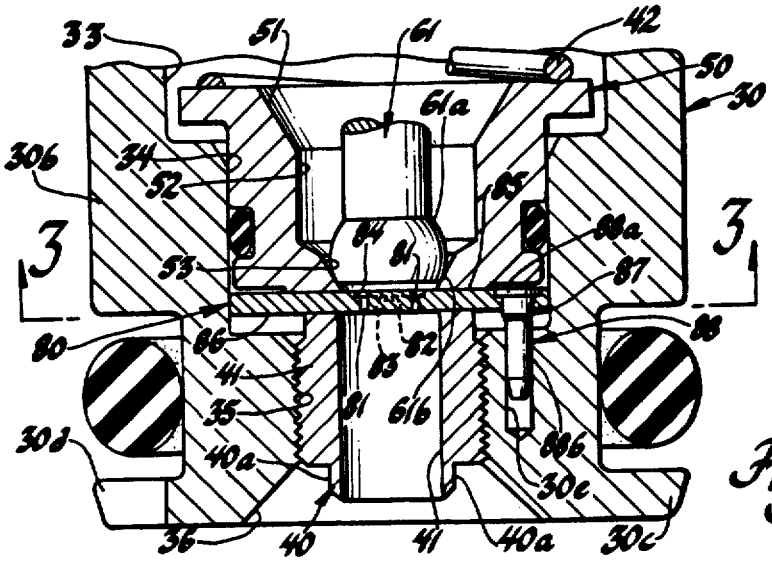
FIG. 2 is an enlarged view of a portion of the injector of FIG. 1 taken at encircled portion 2 of FIG. 1.

Referring now to the subject matter of this invention, the orifice director plate 80, made of a suitable material such as stainless steel, in accordance with the preferred embodiment shown in FIGS. 1–4, is of circular configuration and with a central axis, which axis, as this director plate 80 is mounted in the injector 5, is substantially coaxial with the reciprocating axis of the armature/-valve member 7. Located about a bolt circle of predetermined diameter that is positioned concentric to the central axis of this director plate 80 and radially inward of the lower end of the valve seat 53, as best seen in FIGS. 1 and 2, are two sets of orifice passages, with each such set including, at least, a first orifice passage 81, a second orifice passage 82 and a third orifice passage 83, as best seen in FIG. 3.

These flow orifices passages 81, 82 and 83, of predetermined diameter, extend from an annular groove 84 formed in the upper or upstream surface 85, in terms of the direction of fuel flow, of the director plate 80 to open through the bottom or downstream surface 86 thereof. As best seen in FIG. 2, the outside diameter of the groove 84 is preferably less than or equal to the internal diameter of the valve seat 53 at the lower or downstream end thereof. Accordingly, it should now be apparent that the bolt circle, about which the orifice passages 81, 82 and 83 are formed, is preselected so as to be less than the outside diameter of groove 84.

Figure 4:
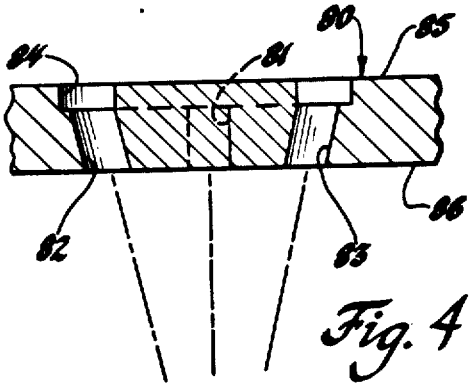
FIG. 4 is an enlarged cross-sectional view of the orifice passage portion of the orifice director plate, per se, taken along line 4—4 of FIG. 3.

Now in accordance with the invention, the orifice passage 81 of each set of such passages extends vertically through the orifice injector plate 80, with reference to the FIGURES, and thus as best seen in FIGS. 3 and 4 has its central axis extending normal to the surfaces 85 and 86 and accordingly parallel to the central axis of the orifice director plate 80 and angularly oriented such that the axis of each of the orifices 81 and the central axis lie in a plane that is normal to the plane extending through the central axis separating, in effect, the two sets of orifice passages 81, 82 and 83.

Each orifice passage 83, of the two sets of orifice passages 81, 82 and 83, is inclined downwardly at a predetermined angle relative to the central axis of the orifice director plate 80, with the axis of each orifice passage 82 angularly oriented at an angle X relative to the axis of the associate orifice passage 81 to one side of the axis thereof, whereby up to a maximum of approximately one-half of the stream of fuel discharged from an orifice passage 82 will impinge upon the stream of fuel discharged from the associate orifice passage 81 on one side of the axis of this latter stream which axis corresponds to the axis of orifice passage 81 at a predetermined downstream location within the discharge passage 41.

In a similar manner, each orifice passage 83, of the two sets of orifice passages, is inclined downwardly at a corresponding predetermined angle relative to the central axis of the orifice director plate 80, with the axis of each orifice passage 83 angularly oriented at an angle X relative to the axis of the associate orifice passage 81 to one side of the axis thereof, which is on the opposite side from that of the associate orifice passage 82, whereby up to a maximum of approximately one-half of the stream discharged from an orifice passage 83 will impinge upon the other side of the stream of fuel discharge from the associate orifice passage 81 in a manner described hereinabove with reference to the orifice passages 82.

Figure 5:
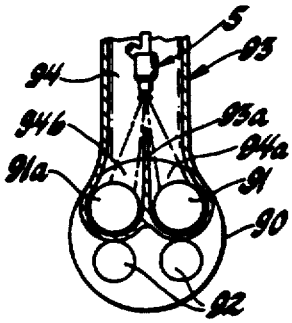
FIG. 5 is a schematic illustration of the induction system for supplying an air/fuel induction charge to a pair of intake valves of a four valve per cylinder type engine and having an electromagnetic fuel injector with an orifice director plate in accordance with the invention incorporated therein.

Referring now to FIG. 5, there is schematically shown a portion of a four valve per cylinder type engine, having at least one cylinder 90 provided with two intake valves 91 and 91a and two exhaust valves 92 operatively associated with the cylinder 90 in a conventional manner. An induction charge is supplied to the cylinder 90 via a Y-shaped intake manifold 93 providing an enlarged intake passage 94 at its upstream end, in terms of the direction of flow of the induction charge, which is then divided into branch intake passages 94a and 94b leading to the intake valves 91 and 91a, respectively, with these branch intake passages being separated from each other by a wall 93a of the intake manifold 93.

As shown, an electromagnetic fuel injector, in accordance with the invention is suitably mounted in the intake passage 94 and orientated therein whereby the two separate fuel cone spray patterns are each directed to flow into the separate branch intake passages 94a and 94b toward the intake valve 91 and 91a, respectively.

To effect such orientation, the electromagnetic fuel injector 5, in the construction shown and as best seen in FIGS. 1 and 2, has the nozzle body 30 provided with an orientation slot 30d on the lower outboard flange 30c thereof. In addition, the orifice director plate 80 is provided with a stepped bore 87 therethrough so as to receive the stepped head 88a of orientation pin 88, with the nozzle body 30 having an internal blind bore 30e therein to receive the shank end 88b of thee orientation pin 88. In the embodiment illustrated, this blind bore 30e is located diametrically opposite the orientation slot 30d.

It should now be apparent to those skilled in the art, that an electromagnetic fuel injector 5 having an orifice director plate 80 in accordance with the invention incorporated therein could also be used to supply fuel to two adjacent cylinders of an engine of the type having a single intake valve and single exhaust valve associated with each cylinder, not shown, or alternatively, such an electromagnetic fuel injector 5 could be used to supply fuel to the two bores of an otherwise conventional two bore type throttle body injection system, not shown.

This application is therefore intended to cover such modifications or changes as may come within the purposes of the improvements or scope of the following claims.

The embodiments of the invention in which an exclusive property or privilege is claimed are defined as follows:

1. In an electromagnetic gasoline fuel injector of the type having a housing means providing a fuel chamber therein intermediate the ends of said housing means and which is adapted to be supplied with fuel at a predetermined supply pressure; a fuel injection nozzle means positioned in one end of said housing means and including, in succession extending from said one end, a spray tip means having at its free end a central axial passage therethrough from which fuel is to be discharged from the injector, an orifice director plate having orifice passages extending therethrough and a valve seat means with a central passage means extending therethrough coaxially relative to said central axial passage with one end of said passage means opening into said fuel chamber and which at its opposite end is in direct flow communication with said orifice passages; and an armature valve means operatively positioned relative to said passage means to control fuel flow therethrough; the improvement wherein said orifice director plate is of circular configuration and has an upstream surface and an opposed downstream surface with a central axis located coaxially relative to said axial passage of said spray tip means, said orifice plate having two sets of at least first, second and third orifice passages extending therethrough in circumferentially spaced relationship to each other with one of said sets being located on one side and the other of said sets being located on the opposite side of a vertical plane extending through said axis with said first, second and third orifice passages of said two sets being located on a circumference of a base circle on said upstream surface located concentric with said axis and wherein each of said first orifice passages having an axis extending parallel to said axis and located in a plane extending through said axis at right angle to said vertical plane; each of said second orifice passages having an axis inclined downward from said upstream surface at an angle relative to said axis and angularly orientated relative to one side of said axis of an associate said first orifice passage; and, each of said third orifice passages having an axis inclined downward from said upstream surface at an angle relative to said axis and angularly orientated to an opposite side of said axis of an associate said first orifice passage whereby the three streams of fuel discharged from the first, second and third orifice passages of each said set partially impinge upon each other within said axial passage so as to form two diverging atomized cone fuel sprays to be discharged from said axial passage.

2. In an electromagnetic gasoline fuel injector according to claim 1, wherein said spray tip means includes an external angular orientation means and wherein an internal angular orientation means is operatively associated with said spray tip means and said orifice director plate whereby to effect a predetermined angular orientation of said two sets of said first, second and third orifice passages in said orifice director plate to said external angular orientation means of said spray tip means.

3. An orifice director plate for use in an electromagnetic fuel injector of the type having an orifice director plate located between a solenoid actuated valve and a spray tip having an axial discharge passage therethrough for the discharge of fuel into at least one combustion chamber of an engine, said orifice director plate being of circular configuration with an upstream surface, a parallel opposed downstream surface and a central axis, said orifice plate having two sets of at least first, second and third orifice passages extending therethrough in circumferentially spaced relationship to each other with one of said sets being located on one side and the other of said sets being located on the opposite side of a vertical plane extending through said axis with said first, second third orifice passages of said two sets being located on a circumference of a base circle on said upstream surface located concentric with said central axis and wherein each of said first orifice passages has an axis extending parallel to said central axis and located in a plane extending through said central axis at right angle to said vertical plane; each of said second orifice passages having an axis inclined downward from said upstream surface at an angle relative to said central axis and angularly oriented relative to one side of said axis of an associate said first orifice passage; and, each of said third orifice passages having an axis inclined downward from said upstream surface at an angle relative to said central axis and angularly orientated to an opposite side of said axis of an associate said first orifice passage whereby the three streams of fuel discharged from the first, second and third orifice passages of each said set partially impinge upon each other within said axial discharge passage so as to form two diverging atomized cone fuel sprays to be discharged from said axial discharge passage.

*4. An electromagnetic fuel injector including an orifice plate having two sets of orifice passages extending therethrough in circumferentially spaced relationship, each of said sets of orifice passages comprising at least a pair of orifice passages with the axis of one orifice passage angularly oriented to the side of the axis of another orifice passage, whereby the streams of fuel discharged from the orifice passages of each set partially impinge upon each other so as to form two diverging atomized cone fuel sprays to be discharged from said injector.*

*5. An electromagnetic fuel injector including an orifice plate having two sets of at least first, second and third orifice passages extending therethrough in circumferentially spaced relationship, each of said second orifice passages having an axis angularly oriented to the side of the axis of the associated first orifice passage, and each of said third orifice passages having an axis angularly oriented to the side of the axis of the associated first orifice passage, whereby the three streams of fuel discharged from the first, second and third orifice passages of each said set partially impinge upon each other so as to form two diverging atomized cone fuel sprays to be discharged from said injector.*

*6. An orifice director plate for use in an electromagnetic fuel injector, said orifice director plate having two sets of orifice passages extending therethrough in circumferentially spaced relationship to each other, each of said sets of orifice passages comprising at least a pair of orifice passages with the axis of one orifice passage angularly oriented to the side of the axis of another orifice passage, whereby the streams of fuel discharged from the orifice passages of each set partially impinge upon each other so as to form two diverging atomized cone fuel sprays to be discharged from said injector.*

*7. An orifice director plate for use in an electromagnetic fuel injector, said orifice plate having two sets of at least first, second and third orifice passages extending therethrough in circumferentially spaced relationship, each of said second orifice passages having an axis angularly oriented to the side of the axis of the associated first orifice passage, and each of said third orifice passages having an axis angularly oriented to the side of the axis of the associated first orifice passage, whereby the three streams of fuel discharged from the first, second and third orifice passages of each said set partially impinge upon each other so as to form two diverging atomized cone fuel sprays to be discharged from said injector.*

* * * * *